United States Patent
Sandner et al.

(10) Patent No.: US 9,712,046 B2
(45) Date of Patent: Jul. 18, 2017

(54) DEAD-TIME OPTIMIZATION OF DC-DC CONVERTERS

(75) Inventors: Christoph Sandner, Villach (AT); Gerhard Maderbacher, Markt Hartmannsdorf (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/230,717

(22) Filed: Sep. 12, 2011

(65) Prior Publication Data

US 2013/0063984 A1   Mar. 14, 2013

(51) Int. Cl.
*H02M 1/38* (2007.01)
*H02M 3/158* (2006.01)

(52) U.S. Cl.
CPC ........... *H02M 1/38* (2013.01); *H02M 3/1588* (2013.01); *Y02B 70/1466* (2013.01)

(58) Field of Classification Search
CPC ....... H02M 3/1588; H02M 2001/0054; H02M 2001/0006; H03K 17/102; Y02B 70/1466
USPC ........ 323/222, 224–226, 265, 266, 271–276, 323/282–290; 363/16–17, 21.01, 21.03, 363/80, 97, 21.09, 21.12; 327/149, 158, 327/239, 259, 270, 295
See application file for complete search history.

(56) References Cited

U.S. PATENT DOCUMENTS

| | | | | |
|---|---|---|---|---|
| 5,481,178 A | * | 1/1996 | Wilcox | H02M 3/156 323/224 |
| 5,757,173 A | * | 5/1998 | Agiman | H02M 3/1588 323/282 |
| 6,294,954 B1 | | 9/2001 | Melanson | |
| 6,396,250 B1 | * | 5/2002 | Bridge | H02M 3/1588 323/283 |
| 6,861,826 B2 | * | 3/2005 | Lynch | H02M 3/1588 323/224 |
| 6,933,706 B2 | * | 8/2005 | Shih | H02M 1/38 323/222 |
| 7,301,376 B2 | * | 11/2007 | Capodivacca et al. | 327/112 |
| 7,518,350 B2 | * | 4/2009 | Leung | H02M 7/219 323/241 |
| 7,598,715 B1 | * | 10/2009 | Hariman et al. | 323/271 |
| 7,800,350 B2 | * | 9/2010 | Pigott | H02M 1/38 323/271 |
| 7,868,597 B2 | * | 1/2011 | Dequina | 323/222 |
| 7,880,454 B2 | * | 2/2011 | Latham et al. | 323/284 |
| 7,888,925 B2 | * | 2/2011 | Dequina | H02M 1/38 323/229 |
| 8,299,770 B2 | * | 10/2012 | Qiu et al. | 323/282 |

(Continued)

FOREIGN PATENT DOCUMENTS

EP   2323246 A2   5/2011

OTHER PUBLICATIONS

Office Action, in the German language, from counterpart German Application No. 102012108489.0, dated Aug. 19, 2015, 14 pp.

(Continued)

*Primary Examiner* — Rajnikant Patel
(74) *Attorney, Agent, or Firm* — Shumaker & Sieffert, P.A.

(57) ABSTRACT

Representative implementations of devices and techniques determine the timing of switches associated with a dc-dc converter. The determination is based on a body diode conduction of at least one of the switches, which is detected and used to determine a switching delay.

22 Claims, 7 Drawing Sheets

(56) References Cited

U.S. PATENT DOCUMENTS

| | | | |
|---|---|---|---|
| 8,350,543 B2* | 1/2013 | Loikkanen | H02M 3/1582 323/259 |
| 8,395,362 B2* | 3/2013 | Brown et al. | 323/224 |
| 8,513,933 B2* | 8/2013 | Notman et al. | 323/284 |
| 9,048,730 B2* | 6/2015 | Broussev | H02M 3/1588 323/271 |
| 2009/0033289 A1 | 2/2009 | Xing et al. | |
| 2011/0175582 A1 | 7/2011 | Latham et al. | |

OTHER PUBLICATIONS

Lee et al., "Robust and Efficient Synchronous Buck Converter with Near-Optimal Dead-Time Control," 2011 IEEE International Solid-State Circuits Conference (ISSCC), Feb. 23, 2011, 4 pp.

"High-Efficiency Predictive Synchronous Buck Driver with Enable," UCC27223, Texas Instruments, Dec. 2003, 34 pp.

* cited by examiner

DEAD-TIME OPTIMIZATION OF DC-DC CONVERTERS

BACKGROUND

Various mobile or portable electronic devices may have reduced power consumption by operating some of the systems within these devices at low voltages (e.g., 3.0 volts, 1.5 volts, etc.). Such electronic devices often use direct current to direct current converters ("dc to dc converters" or "dc-dc converters") to "step down" voltages available from their power supplies to the lower voltages used by these systems.

In complex systems, e.g. microcontrollers or mobile communication systems, there may be several different power supply output voltage requirements. For example a digital block might need voltage scaling capability, whereas analog parts may need different supply voltages. In some cases, multiple dc-dc converters may be implemented within a complex device. For example, dc-dc converters may be integrated with various systems on-chip. However, dc-dc converter solutions often suffer from significant switching losses, especially when operated at higher switching frequencies.

Body diode conduction losses can be a major loss contributor, especially in high frequency dc-dc converters. These losses occur due to imperfect switching time instances of the power switches, which lead to current flow through the parasitic body diode of one or more power switches. Converters having fixed power switch timing often have poor efficiency since dc-dc converters operate over various process, voltage, and temperature (PVT) variations that may impact switch timing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different FIGS. indicates similar or identical items.

For this discussion, the circuits illustrated in the figures are shown as having a multiplicity of components. Various implementations of circuits, as described herein, may include fewer components and remain within the scope of the disclosure. Alternately, other implementations of circuits may include additional components, or various combinations of the described components, and remain within the scope of the disclosure.

DETAILED DESCRIPTION

Overview

Representative implementations of techniques and/or devices provide power switch timing control of a dc-dc converter, and in particular, provide optimized coordination of input power switch timing to output power switch timing. In various implementations, the coordination is based on a measurement of body diode conduction in one or more power switches. Power switch timing may be dynamically adjusted with ongoing switching cycles, by introducing varying switching delays based on the measured body diode conduction.

Figure 1:
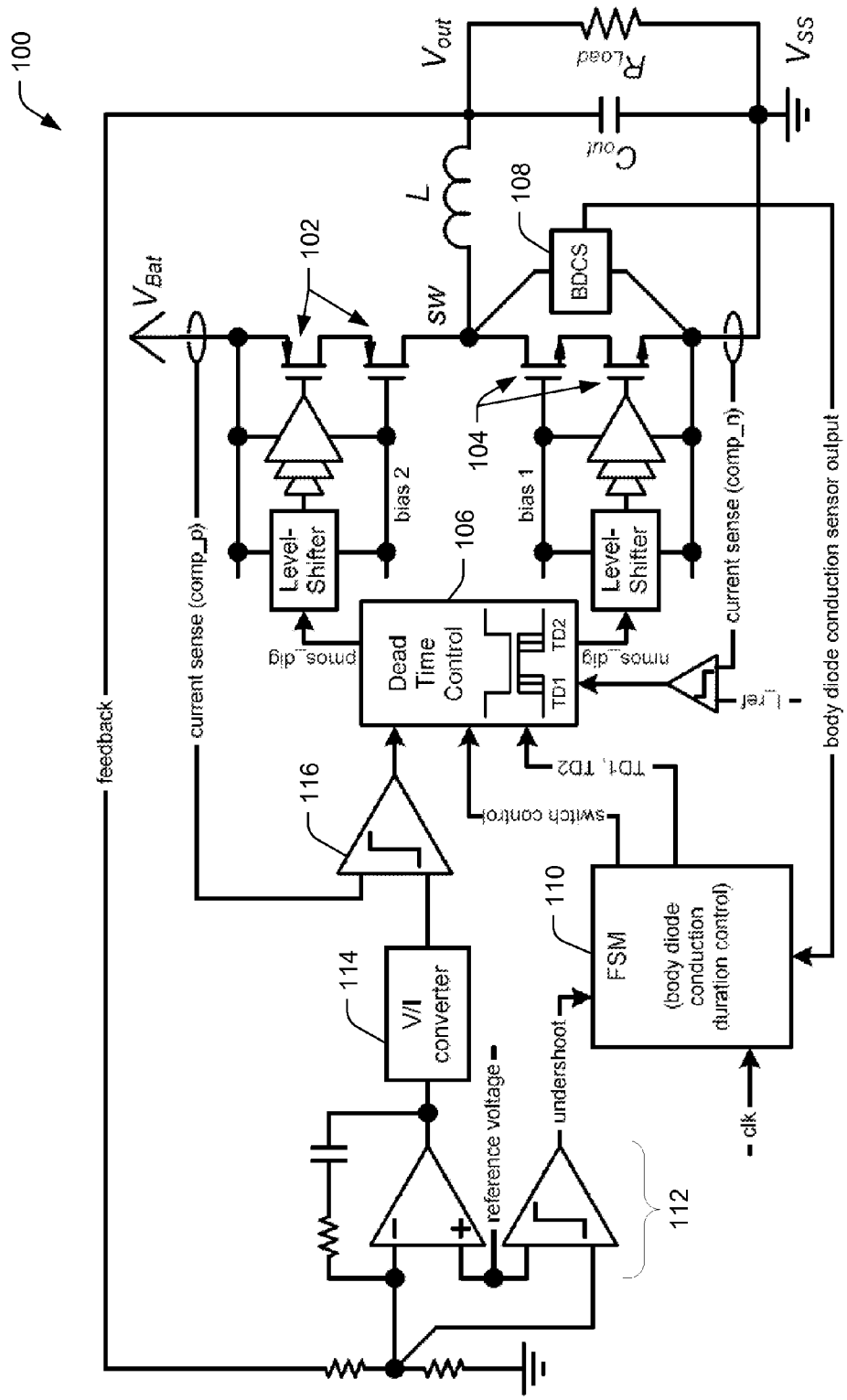
FIG. 1 is a schematic drawing of an example dc-dc converter circuit according to an implementation.

Various implementations of power switch timing control for a dc-dc converter with respect to an example dc-dc converter design illustrated in FIG. 1 are discussed. The representative dc-dc converter illustrates one example of techniques and devices as may be applied to an electronic device. Techniques and devices of power switch timing control are then discussed with reference to example sensing and control circuits, along with various related waveforms illustrated in FIGS. 2 and 3. The techniques and devices discussed may be applied to any of various dc-dc converter designs, circuits, and devices and remain within the scope of the disclosure. The illustrated waveforms show current through the coil in the example dc-dc converter, and demonstrate how a switch control determination may be made based on timing characteristics of the current waveforms and associated control signals. Example implementations of a body diode conduction sensor circuit and a dead time control unit circuit are then discussed with reference to FIGS. 4 and 5. Finally, this disclosure discusses example processes of controlling power switch timing of a dc-dc converter with reference to flow diagrams shown in FIGS. 6 and 7.

Implementations are explained in more detail below using a plurality of examples. Although various implementations and examples are discussed here and below, further implementations and examples may be possible by combining the features and elements of individual implementations and examples.

Example DC-DC Converter

FIG. 1 is a schematic drawing showing an illustrative dc-dc converter circuit 100, wherein an implementation of power switch timing control may be employed. It is to be understood that power switch timing control may be implemented as part of the dc-dc converter circuit 100, or as part of another system (e.g., as a peripheral to a dc-dc converter 100, etc.). The illustrated dc-dc converter in FIG. 1 is shown and described in terms of a "buck" device, which reduces the input DC voltage ($V_{BAT}$) to a desired lower output DC voltage ($V_{OUT}$). This illustration is, however, for ease of discussion. The techniques and devices described herein with respect to power switch timing control for dc-dc converters is not limited to the circuit illustrated in FIG. 1 or to a buck device, and may be applied to other types of dc-dc converters (e.g., boost, buck-boost, etc.), or other dc-dc converter designs without departing from the scope of the disclosure.

As shown in FIG. 1, the output stage of example dc-dc converter 100 consists of input-side and output-side power switches, which are connected to a passive output filter. The dc-dc converter 100 may be designed with input power supply switching devices 102 and output power supply switching devices 104 such as P-type Metal Oxide Semiconductor (PMOS) and N-type Metal Oxide Semiconductor (NMOS) devices, for example. In other implementations, a dc-dc converter 100 may be implemented using diodes, other types of transistors, or the like, as power supply switching devices 102 and 104. In alternate implementations, one or more switching devices may be used as an input power supply switching device 102 or as an output power supply switching device 104. Stacked transistors may be used for the power switches 102 and 104 to provide a supply voltage capability up to a desired voltage (e.g., 5 V).

The power supply switching function of the power supply switching devices 102 and 104 determines the flow of current through the output coil (inductor) L and the current through the capacitor $C_{OUT}$ by switching on and off at particular times. Load current is supplied by both the current through the inductor L, when one of the output switching device(s) 102 and 104 are "on," and current through the capacitor $C_{OUT}$, when the capacitor $C_{OUT}$ discharges.

Bias voltages for the power supply switching devices 102 and 104, bias 1 and bias 2 respectively, may be generated internally by means of source follower structures. Tapered buffers may be used as gate drivers, shown connected to bias 1 and VSS, and bias 2 and $V_{Bat}$ respectively. This structure allows simple and fast control of the power switches 102 and 104 using the signals pmos_dig and nmos_dig respectively. Both signals pmos_dig and nmos_dig are controlled by a dead time control unit (DTCU) 106 in this example. In the illustrated implementation, two level shifters are used to shift the signals coming from the core supply domain (e.g., 1.2 V) of the DTCU 106 to the power domain of the output stage of the dc-dc converter 100. The DTCU 106 generates a non-overlapping switching time sequence of the power switches 102 and 104. Additionally, as shown in the illustrated implementation, a body diode conduction sensor (BDCS) 108 is used to detect body diode conduction at the output power switches 104. The detection information is fed back to a finite state machine (FSM) 110 where two control signals TD1 and TD2 for the non-overlapping delay times may be adjusted.

In one implementation, the dc-dc converter 100 operates in pulse width modulation—discontinuous conduction mode (PWM-DCM). An analog PI controller 112 compares the feedback voltage, which is divided by resistors down to the core voltage domain (e.g., 1.2 V), with an internally generated reference voltage. A voltage to current converter (V/I converter) 114 converts the output voltage of the PI controller 112 into a current. This current is the actuating variable and sets the peak current through the power inductor L during operation (current mode control). A current comparator 116 compares the actuating variable with the current through the input-side power switch 102, which is also the current through the power inductor L during the on-phase. In an implementation, a rising edge at the comparator 116 output signals a current cross point to the DTCU 106, subsequently switching off the input-side power switch 102.

Power Switch Timing Optimization

As mentioned above, body diode conduction losses can be a major loss contributor especially in high frequency dc-dc converters. Body diode conduction losses may occur due to imperfect switching time instances of the power switches 102 and 104, which may lead to a current flow through the parasitic body diode of the input power switch 102 and/or the output power switch 104. Accordingly, power switch timing may be optimized to minimize body diode conduction durations, while ensuring that little or no shoot through current flows through power switches 102 and 104. Further, power switch timing optimization may be applied over process, voltage, and temperature (PVT) variations and operating conditions. In an implementation, power switch timing may be optimized during normal dc-dc converter operation by varying the dead time between switching points of the input and output power switches (i.e., 102 and 104 respectively).

Figure 2:
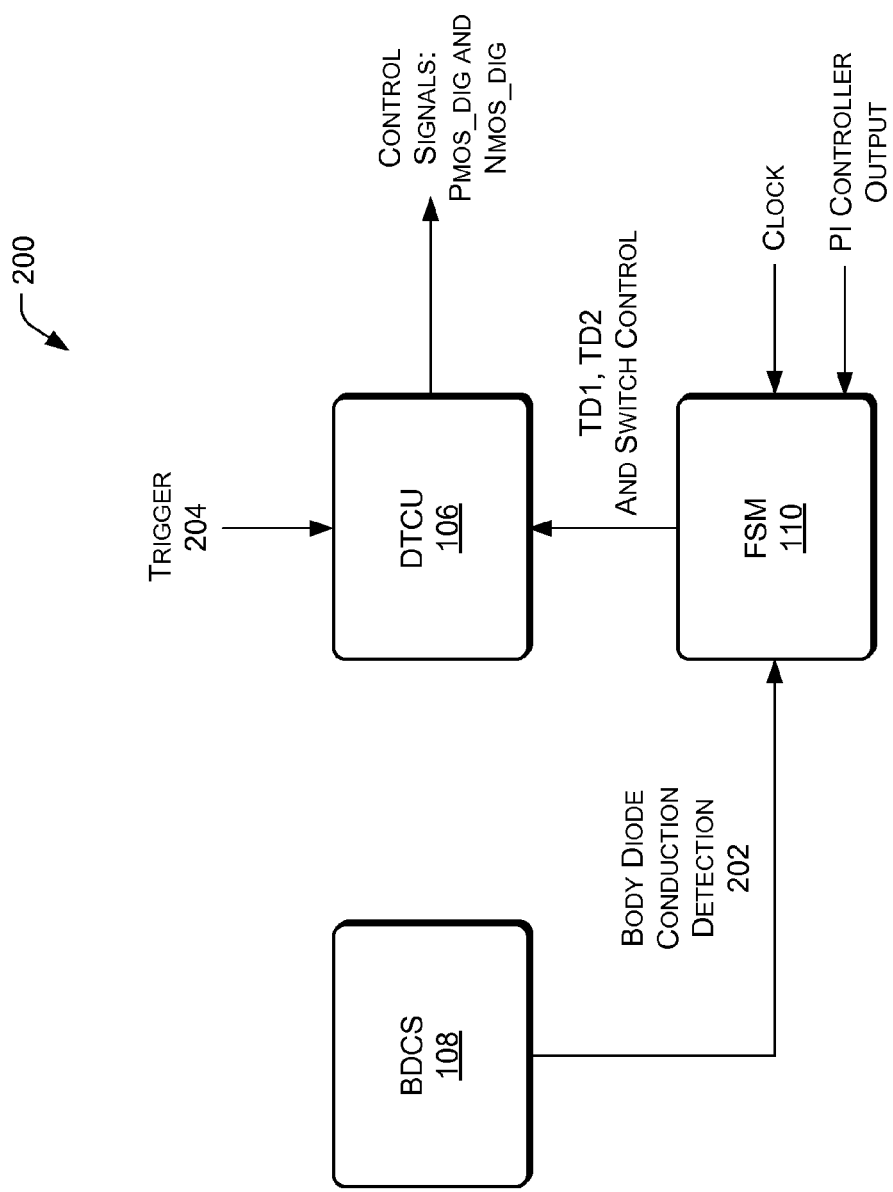
FIG. 2 is a block diagram of an example detector block and control block according to an implementation.

In an implementation, the switching time instances (e.g., switching on and/or off) of the output-side power switch 104 are adjusted depending on the level of body diode conduction at the switch 104. Control of power switch timing may be accomplished using an apparatus (such as apparatus 200 in FIG. 2) or a combination of devices that perform the functions of detecting body diode conduction in a power switch and adjusting the switching time instances based on the detected conduction. The block diagram of FIG. 2 illustrates an example body diode conduction sensor (BDCS) 108 ("detector block" 108) and an example dead time control unit (DTCU) 106 ("control block" 106) according to an implementation, for performing these functions. In various implementations, these functional blocks may be carried out using devices integrated into a dc-dc converter (e.g., as shown in the example dc-dc converter 100 of FIG. 1), they may be separate components that are coupled to a dc-dc converter, stand-alone components, or they may be a combination of integrated and separate components.

In an implementation, the detector block 108 detects body diode conduction at an output power switch (e.g., switch 104) of a dc-dc converter (e.g., dc-dc converter 100). The detector block 108 outputs the body diode conduction detections 202, to be received by the control block 106. As shown in FIGS. 1 and 2, an asynchronous or synchronous digital state machine such as finite state machine (FSM) 110 may also be included and arranged to generate control signals for the control block 106. The generated control signals are configured to control timing of the output power switch 104, based on the body diode conduction detected by the detector block 108. If included, the FSM 110 receives the body diode conduction detections 202 output by the detection block 108 and outputs adjustable values TD1, TD2, and switch control signals to the control block 106. Further, the FSM 110 may use inputs such as clock signals and/or outputs from the PI controller in generating adjustable values TD1 and TD2. In various implementations, some or all of the functionality of the FSM 110 may be included in another block, for example, control block 106.

Control block 106 receives a trigger 204 and sends control signals pmos_dig and/or nmos_dig to power switches 102 and 104 respectively. In one implementation, trigger 204 is based on a current at an input stage of the dc-dc converter 100 (e.g., the current through inductor L). For example, the trigger 204 may be based on the current crossing a threshold value, such as an upper current limit. Alternatively, the trigger 204 may be based on an analog voltage or digital counter. Moreover, the trigger 204 may be based on an amount of time the input power switch 102 is in an enabled state. Upon receiving the trigger 204, the control block 106 may send a signal pmos_dig to switch off the input power switch 102. Concurrently or simultaneously, the control block 106 may initiate a delay of the switching operation of the output power switch 104 based on the adjustable value TD1 received from the FSM 110. At the conclusion of the delay, the control block 106 sends a signal nmos_dig to the output power switch 104, for example, to turn on the output power switch 104. Additionally, in an implementation, the control block 106 receives a second trigger, for example when the inductor current L meets a second threshold (e.g., at a minimum value). The control block 106 then initiates another delay based on adjustable value TD2, after which the control block 106 sends another signal nmos_dig to turn off the output power switch 104. The adjustable values TD1 and TD2 may be adjusted at each switching cycle, as is described further below.

Figure 3:
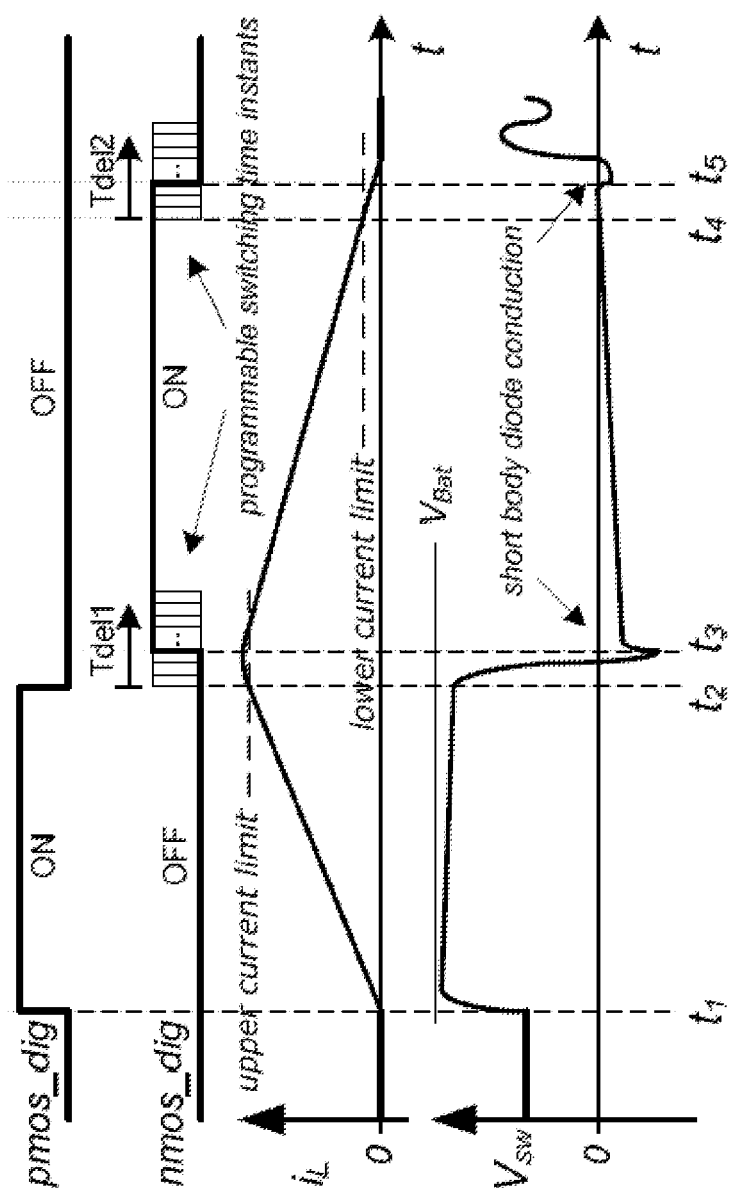
FIG. 3 is an illustrative signal timing diagram according to an implementation.

FIG. 3 shows an illustrative signal timing diagram for an example dc-dc controller 100. Included in FIG. 3 are digital control signals pmos_dig and nmos_dig for power switches 102 and 104 respectively, the current waveform ($i_L$) through the power inductor L, and the voltage waveform at the switching node (Vsw). According to an example implementation, the coil current $i_L$ increases at time $t_1$, when the input-side power switch 102 is switched on. If the coil current $i_L$ crosses the upper current limit, the input-side switch 102 is switched off (at time instant $t_2$). At the same time instant, a programmable delay is triggered which delays the switch-on phase of the output-side switch 104 (delay Tdel 1) according to a predefined value set by adjustable value TD1. The switch-on phase of the output-side switch 104 occurs at time $t_3$, at the conclusion of the programmable delay. In an implementation, body diode conduction may be minimized, if not completely avoided, by choosing a particular value for TD1, and thus, particular delay duration. The same approach may be used to optimize the switch-off phase of the output-side switch 104. If the coil current $i_L$ crosses a given lower current limit, a second programmable delay (delay Tdel 2) is triggered which delays the switch-off phase of the output-side switch 104 according to another predefined value TD2. The switch-off phase of the output-side switch 104 occurs at time $t_4$, at the conclusion of the second programmable delay. By properly choosing the value TD2, the output-side power switch 104 is switched-off substantially when the coil current becomes zero (e.g., at time $t_5$). With that switch timing, no body diode conduction occurs. The maximum delays for both programmable delays may be designed to be large enough to ensure that the delays are within the delay range for all PVT corners and over all converter conditions.

Example Body Diode Conduction Sensor

Figure 4:
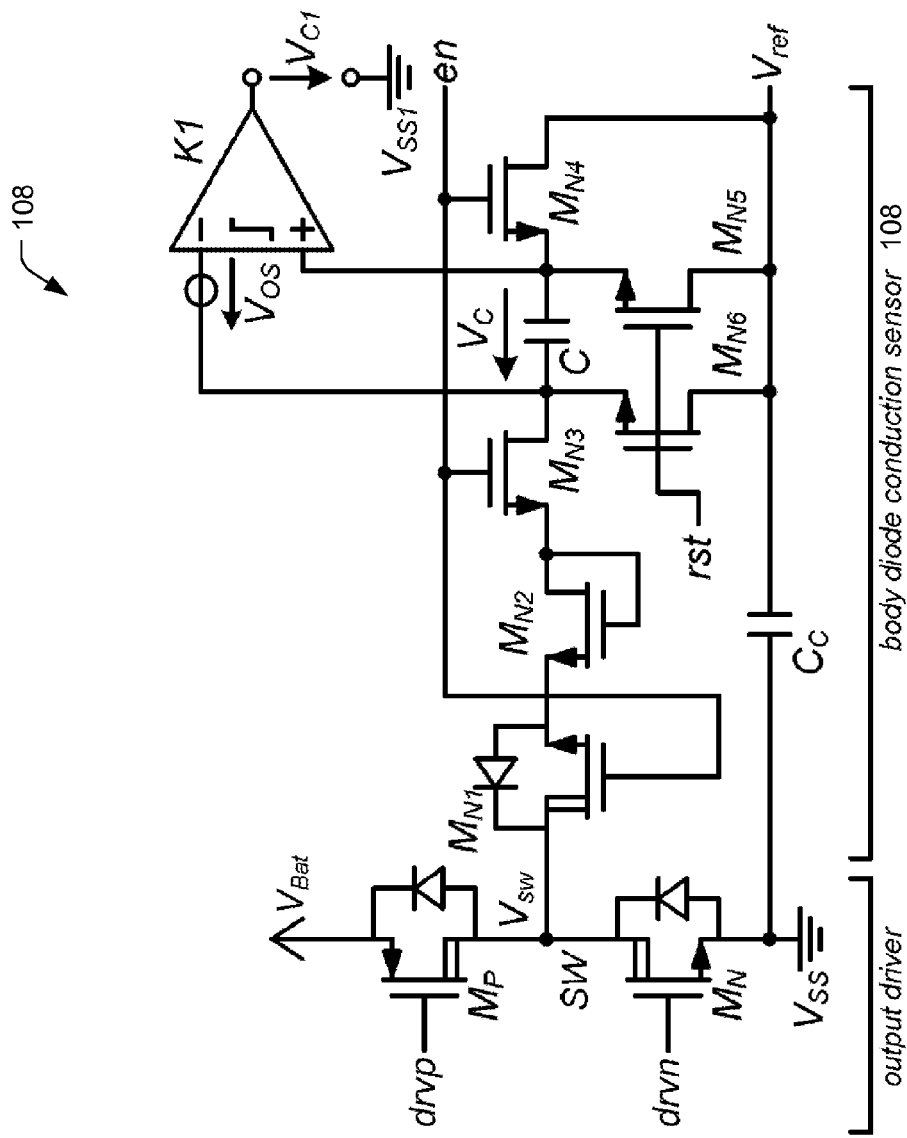
FIG. 4 is a schematic drawing of a body diode conduction sensor circuit according to an example implementation.

FIG. 4 is a schematic drawing of an example body diode conduction sensor circuit (e.g., BDCS 108) according to an example implementation. In various implementations, other designs may be used to perform the functions described herein. One or more body diode conduction sensors (BDCS) 108 may be used to detect body diode conduction for both, the on- and off-transition of the output-side switch 104. The BDCS 108 may be coupled between the switching node SW and VSS (see FIG. 1). At each switching cycle, the BDCS 108 detects whether body diode conduction occurs during operation of the output power switch 104. In an example implementation, as described above, this information is fed back to the FSM 110 where an optimization algorithm adjusts the preset values TD1 and TD2 for the delay lines of the DTCU 106.

For ease of discussion, the schematic of FIG. 4 includes an example BDCS circuit (such as BDCS 108) and an output driver portion of an example dc-dc converter. As shown in the schematic of FIG. 4, the BDCS 108 rectifies the forward voltage across the body diode of $M_N$ and stores the rectified voltage in a capacitor C. Accordingly, the BDCS 108 works as fast peak detector such that the negative voltage peak at the switching node $V_{SW}$ due to body diode conduction is detected. The BDCS 108 is connected to the source of one switch transistor $M_{Ni}$ and a reference voltage $V_{ref}$ which is close in voltage to VSS. Two digital input signals "en" and "rst" control the three different operating modes of the sensor: 1) reset mode when rst=1 (capacitor C will be discharged and the sensor output voltage $V_C$ becomes zero); 2) sense mode when rst=0 and en=1 (enables the BDCS 108 for sensing body diode conduction); and 3) hold mode when rst=0 and en=0 (disables the BDCS 108 and holds the stored charge in capacitor C). In example implementations, one sensor can be used to detect body diode conduction from t=t2 to t=t3 or from t=t4 to t=t5 (see FIG. 3).

For body diode conduction detection at the second period, the functionality of the BDCS 108 may be as follows: during period t=t3 to t=t4 $M_{N5}$ and $M_{N6}$ are switched on by the control signal "rst" (reset mode), discharging the capacitor C. During phase t=t4 to t=t5 the switching transistor $M_{N1}$ and the pass transistors $M_{N3}$ and $M_{N4}$ are switched on (sense mode). During this period the BDCS 108 acts as a negative voltage peak detector with respect to $V_{ref}$. When $V_{SW}$ becomes negative with respect to $V_{ref}$, current can flow through $M_{N2}$ which results in charging the capacitor C. The amount of charging is determined by the duration of body diode conduction. After detecting body diode conduction, the BDCS 108 can be disabled and the stored charge in C may remain constant (hold mode). Thus, a slow comparator K1 with inherent offset $V_{OS}$ can be used to evaluate $V_C$ and therefore evaluate if body diode conduction occurred. In sense mode, the voltage $V_C$ across the capacitor C can be determined by the equation:

$$V_C = V_{ref} - V_{DS\ MN} - V_{DS\ MN4} - V_{DS\ MN3} - V_{GS\ MN2} - V_{DS\ MN1}|_{max} \quad (1)$$

where the $V_{DS}$ are the drain source voltages of the corresponding transistors and $V_{GS\ MN2}$ is the gate source voltage of transistor $M_{N2}$. If the time constant $C \cdot (r_{ON\ MN4} + r_{ON\ MN3} + r_{ON\ MN1})$ is low compared to the lowest possible detectable body diode conduction duration, the drain-source voltage drops of the switch and pass transistors can be neglected, and equation (1) can be simplified to:

$$V_C \approx V_{ref} - V_{DS\ MN} - V_{GS\ MN2}|_{max} \quad (2)$$

Assuming, for example, that the threshold voltage of transistor $M_{N2}$ is 0.3 V and $V_{ref}$ is set to 0.1 V, by evaluating equation (2) $V_C$ becomes positive if $V_{DS\ MN}$ is lower than negative 0.2 V. In other words, the detector is able to detect body diode conduction voltages $V_{BD\ MN\ t5}$ down to 0.2 V. As seen in equation (2), $V_{ref}$ can be used to adjust the detection thresholds. If $V_{ref}$ is increased, the sensor is adjusted to sense smaller body diode conduction voltages and vice versa. $V_{ref}$ is capacitively coupled to the power ground VSS by a capacitor $C_C$. This makes the BDCS 108 generally insensitive concerning ringing at VSS.

Example Dead Time Control Unit

Figure 5:
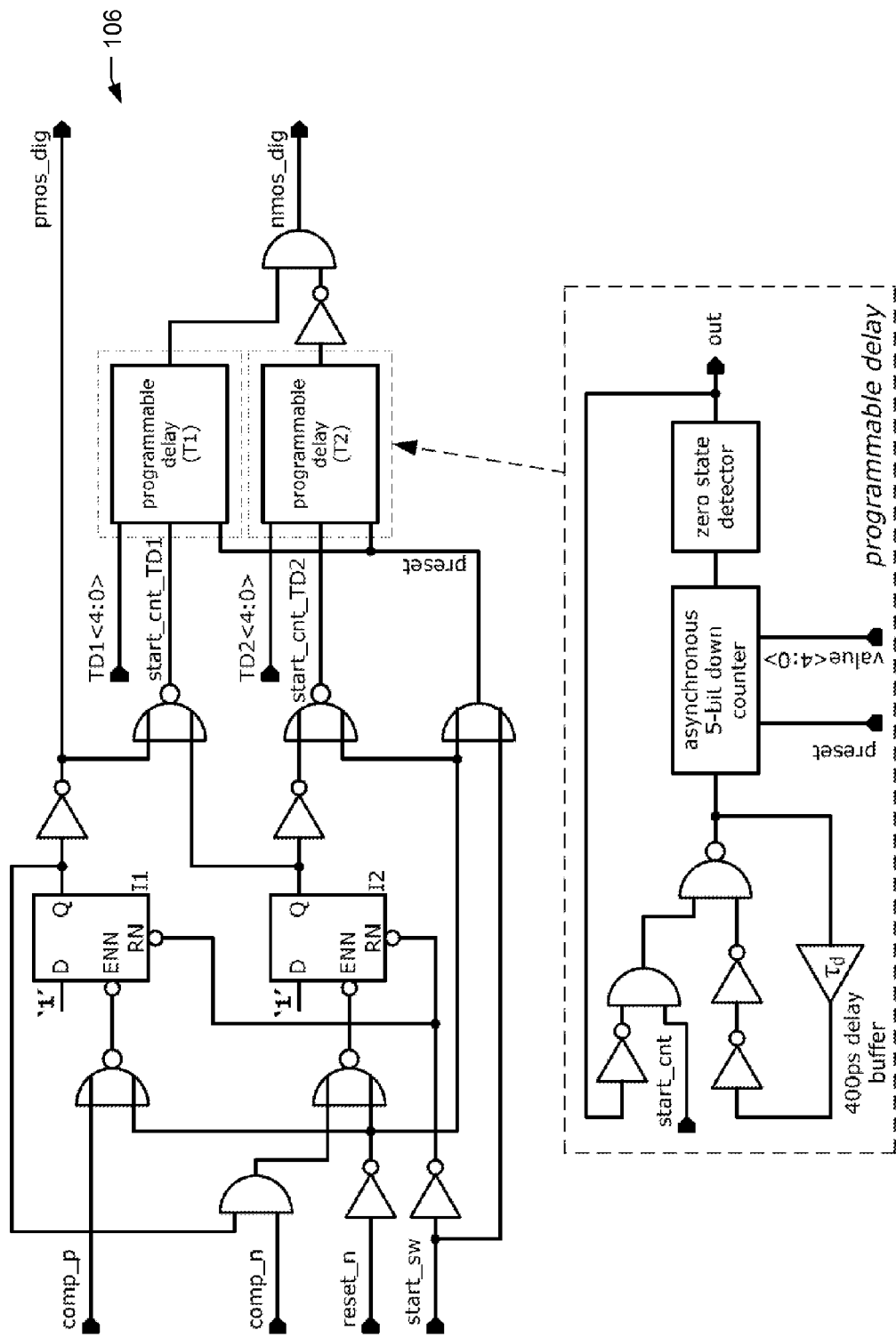
FIG. 5 is a schematic drawing of a dead time control unit circuit according to an example implementation.

FIG. 5 is a schematic drawing of an example dead time control unit circuit (such as DTCU 106) according to an implementation. In various implementations, other designs may be used to perform the functions described herein. For example, the DTCU 106 is a state machine that generates the digital control sequence for the power switches 102 and 104, outputting control signals pmos_dig and nmos_dig. As discussed above, the generated control signals control the three different states: 1) both input-side and output-side power switches are off; 2) only the input-side switch is on; and 3) only the output-side switch is on.

An example of the operation of DTCU 106 as illustrated is as follows. After reset, the DTCU 106 is in state 1 where both control signals pmos_dig and nmos_dig are logical "0". At the rising edge of a voltage pulse at pin start_sw the DTCU 106 changes to state 2 where pmos_dig goes to logical "1". The DTCU 106 remains in this state at least as long as the signal start_sw is logical "1", which allows defining a minimal state duration of this state. If the upper current limit is detected (comp_p goes to logical "1") (see also FIG. 3) the DTCU 106 changes from state 2 to state 3. The signal start_cnt_TD1 indicates the state transition and it is delayed by dint of a programmable delay line. This means that the rising edge of control signal nmos_dig of the output-side switch is delayed according to a predefined multi-bit (e.g., 5-bit) value of TD1 (see FIG. 3). The DTCU 106 goes back again to state 1 on receipt of a rising edge of signal comp_n (i.e., lower current limit was detected). At the state transition the signal start_cnt_TD2 is delayed by a second programmable delay line. This means that the falling edge of the output-side switch control signal nmos_dig is delayed according to the predefined value of TD2 (see FIG. 3). The programmable delay line consists of a ring oscillator which clocks an asynchronous multi-bit (e.g., 5-bit) down counter. The oscillator starts if signal start_cnt goes to logical "1" and it stops if the counter value becomes "zero". In one implementation, the oscillator frequency is approximately 1 GHz, therefore, the resolution of the delay line is about 1 ns. Since the delay line blocks are typically only active for a few oscillator cycles their power consumption is negligible.

Representative Optimization Algorithm

Figure 6:
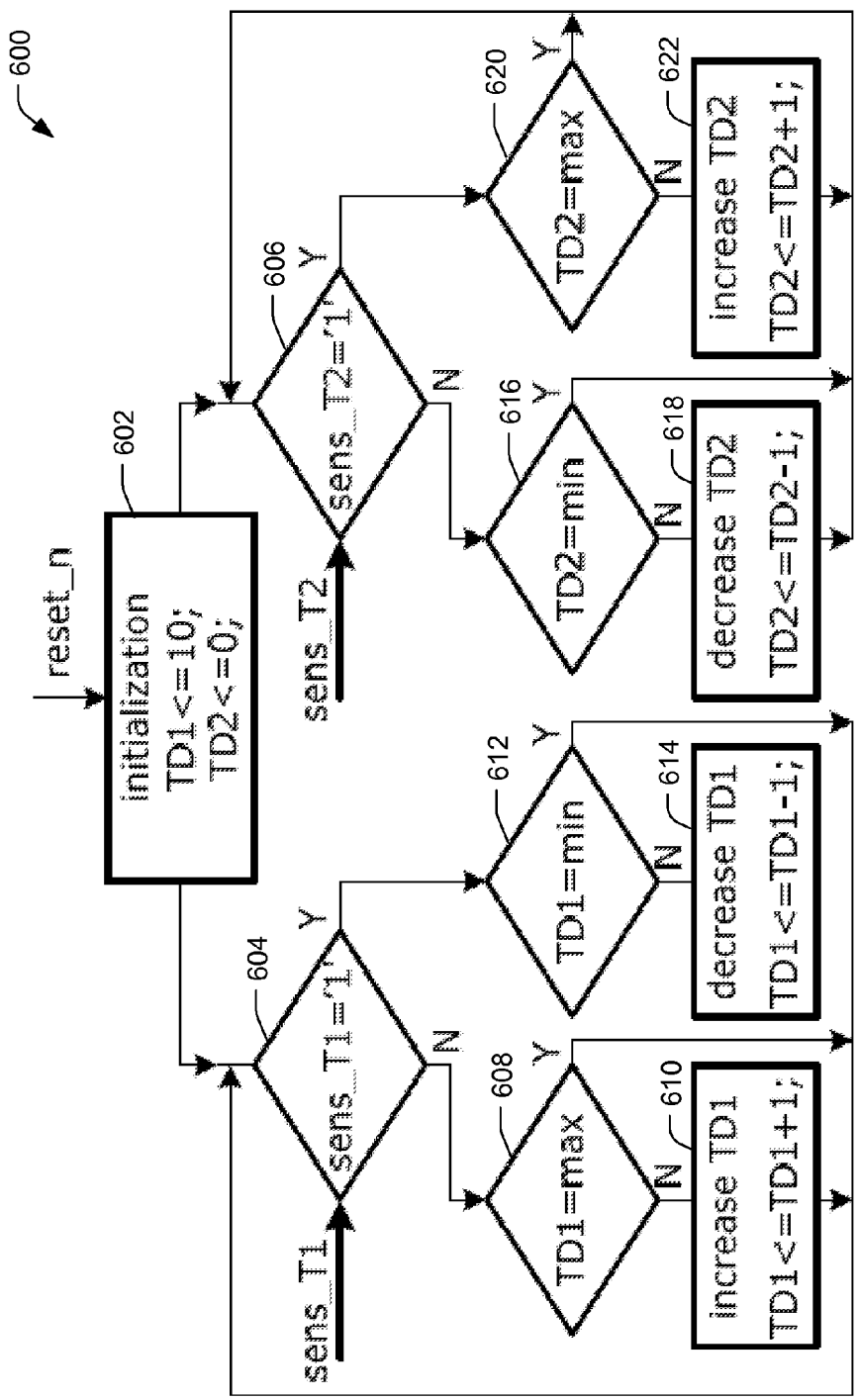
FIG. 6 is a flow diagram illustrating an example optimization algorithm for controlling switching operations of a dc-dc converter according to an implementation.

FIG. 6 is a flow diagram illustrating an example optimization algorithm 600 for controlling switching operations of a dc-dc converter 100 according to an implementation. In various implementations, the example optimization algorithm 600 may be used by a DTCU 106 as described above, or by another component or components to perform the described functions. In general, the FSM 110 adjusts the adjustable values (TD1 and TD2) of the programmable delay lines in the DTCU 106 according to the output of the body diode conduction sensor(s) 108. The block diagram of the optimization algorithm 600 as shown in FIG. 4 describes one example process. In the example shown, two body diode conduction sensors 108 are used, one (BDCS 1) for switching "on" the output power switch 104 and another (BDCS 2) for switching "off" the output power switch 104. This arrangement is for ease of discussion, since in various implementations, the functions described may be performed by one single BDCS 108, or more than 2 BDCS 108 devices.

As described above, the one or more BDCS 108 devices provide output that determines the adjustable values TD1 and TD2. The adjustable values TD1 and TD2 determine the duration of programmable delays that are applied to switch timing for the power switches 102 and 104. In various implementations, one or more programmable delays may be triggered by a current based on an input power stage of the dc-dc converter 100 reaching a preset current threshold.

During reset at block 602, the preset (adjustable) values TD1 and TD2 are initialized. Next, at blocks 604 and 606, the algorithm 600 checks if BDCS 1 (sens_T1="1") or if BDCS 2 (sens_T2="1") have detected body diode conduction. For instance, if BDCS 1 has detected body diode conduction (at block 604), and the value of TD1 has not reached a minimum value (block 612), then the value of TD1 for the programmable delay line is decremented (block 614), which means that the output-side switch 104 is switched on earlier at the next switching cycle (the programmable delay count is decreased).

Alternately, if BDCS 1 has not detected body diode conduction (at block 604) and the value of TD1 has not reached a maximum value (block 608), then TD1 will be incremented (block 610). Accordingly, the output-side switch 104 is switched on later at the next switching cycle (the programmable delay count is increased).

This means that in steady state, TD1 may toggle between two values, where in one switching cycle body diode conduction is detected and at the next cycle no body diode conduction is detected. In an implementation where the resolution of the programmable delay line is about 1 ns, the remaining body diode conduction duration averages about 500 ps, which is generally sufficient for high frequency converters. This remaining body diode conduction duration can be further reduced by increasing the resolution of the programmable delay line. It is also important that the resolution of the programmable delay line is chosen high enough to avoid shoot through currents through the power switches due to large delay time steps.

Continuing, if BDCS 2 has detected body diode conduction (at block 606), and the value of TD1 has not reached a maximum value (block 620), then the value of TD2 for the programmable delay line is incremented (block 622), which means that the output-side switch 104 is switched off later at the next switching cycle (the programmable delay count is increased).

Alternately, if BDCS 2 has not detected body diode conduction (at block 606) and the value of TD2 has not reached a minimum value (block 616), then TD1 will be decremented (block 618). Accordingly, the output-side switch 104 is switched off earlier at the next switching cycle (the programmable delay count is decreased).

Representative Process

Figure 7:
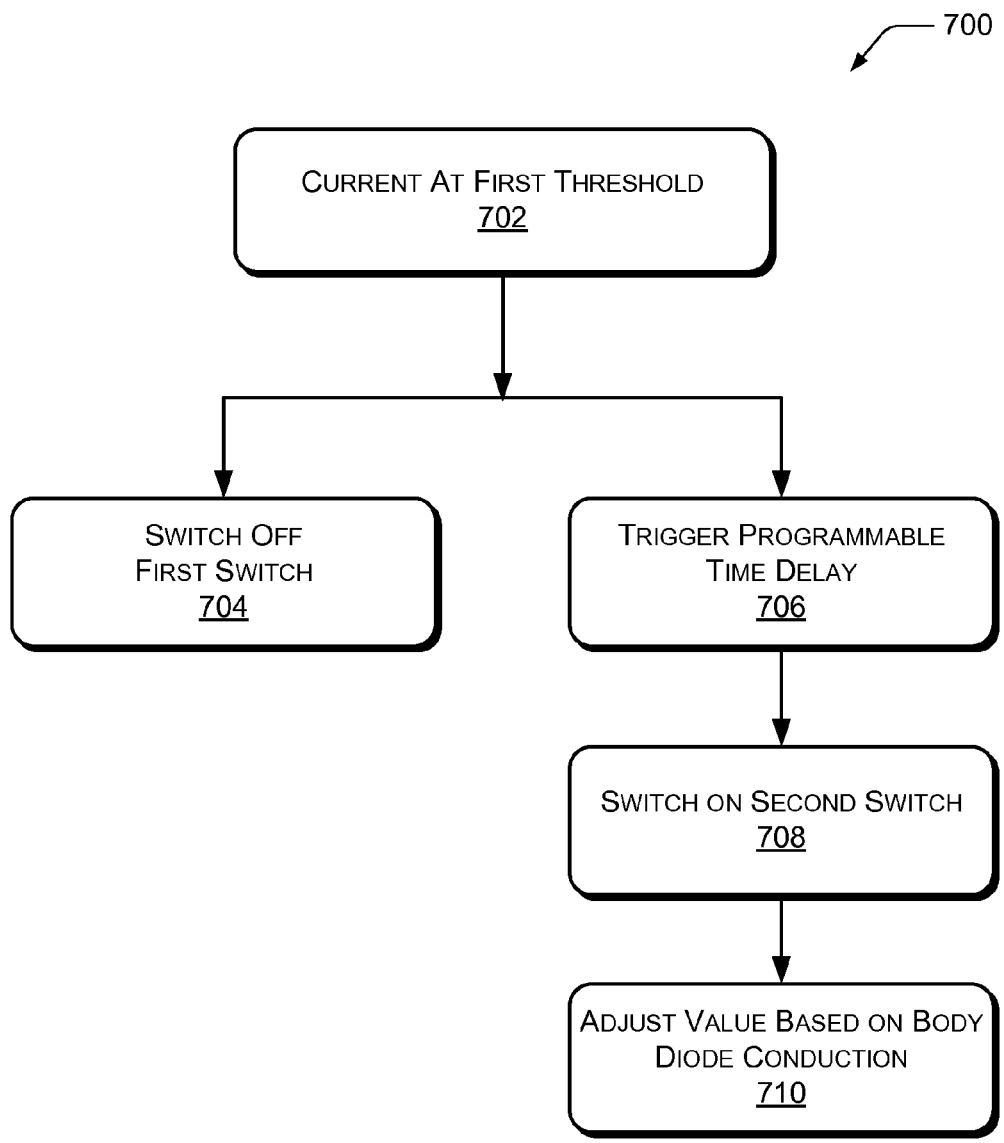
FIG. 7 is a flow diagram illustrating an example process for controlling switching operations of a dc-dc converter according to an implementation.

FIG. 7 illustrates a representative process 700 for implementing power switch timing control including dead-time optimization for a dc-dc converter (such as the dc-dc converter 100). An example process 700 includes determining when the power switches (such as power switches 102 and 104) of the dc-dc converter switch on and off relative to each other. In various implementations, the determination is based on a detection of body diode conduction at one or more of the power switches 102 and 104. In one implementation, the operation of one or more of the switches 102 and 104 may be delayed based on detected body diode conduction. The process 700 is described with reference to FIGS. 1-6.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 702, current based on a first switch (such as input power switch 102) meets a current threshold. In one implementation, the current is the inductor output current and the current threshold is an upper current limit.

At block 704, the first switch is switched off, based on the current meeting the current threshold. In one implementation, switching off the first switch comprises switching off an input stage of a dc-dc converter. Concurrently, at block 706, a programmable time delay is triggered. In an implementation, the programmable time delay is based on an adjustable value (such as adjustable value TD1).

At block 708, a second switch (such as output power switch 104) is switched on at the conclusion of the programmable time delay. In one implementation, switching on the second switch comprises switching on an output stage of the dc-dc converter.

At block 710, the adjustable value is adjusted based on body diode conduction of least at one of the first switch or the second switch. The adjustable value, as adjusted, is applied to the programmable delay during the next switch cycle.

In one implementation, the process 700 further comprises measuring the body diode conduction of at least one of the first switch and the second switch. In such an implementation, the measuring may be performed by a body diode conduction sensor (such as BDCS 108).

In another implementation, the process 700 further comprises adjusting the adjustable value at successive switching cycles of the second switch. In the implementation, the body diode conduction at the second switch is minimized with each successive switching cycle.

In a further implementation, the process 700 further comprises triggering a second programmable time delay based on a second adjustable value when the current based on the first switch meets a second current threshold. At the conclusion of the second programmable time delay, the second switch is switched off In one implementation, switching off the second switch comprises switching off the output stage of the dc-dc converter.

In an implementation, the process 700 further comprises adjusting the second adjustable value based on a body diode conduction of at least one of the first switch and the second switch. In one example, the process 700 includes adjusting the second adjustable value such that the second switch is switched off when the current based on the first switch becomes zero.

In alternate implementations, other techniques may be included in the process 700 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A method of controlling a dc-dc converter, comprising:
    switching off a first switch when a current based on the first switch meets a first current threshold;
    triggering a time delay based on an adjustable value;
    switching on a second switch at the conclusion of the time delay;
    adjusting the adjustable value based on a body diode conduction of at least one of the first switch and the second switch, the adjusting of the adjustable value occurring at successive switching cycles of the first switch or the second switch; and
    adjusting the adjustable value at successive switching cycles of the second switch such that the body diode conduction is minimized with each successive switching cycle.

2. The method of claim 1, further comprising measuring the body diode conduction of at least one of the first switch and the second switch.

3. The method of claim 1, further comprising:
    triggering a second time delay based on a second adjustable value when the current based on the first switch meets a second current threshold;
    switching off the second switch at the conclusion of the second time delay; and
    adjusting the second adjustable value based on a body diode conduction of at least one of the first switch and the second switch.

4. The method of claim 3, further comprising adjusting the second adjustable value such that the second switch is switched off when the current based on the first switch becomes zero.

5. The method of claim 1, wherein switching off the first switch comprises switching off an input stage of the dc-dc converter.

6. The method of claim 1, wherein switching on the second switch comprises switching on an output stage of the dc-dc converter.

7. A method comprising:
    adjusting an adjustable value according to body diode conduction at a dc-dc converter output stage switch;
    determining a time delay based on the adjustable value;
    switching on the dc-dc converter output stage switch at the conclusion of the time delay;
    decreasing the adjustable value when body diode conduction is detected at the dc-dc converter output stage switch; and
    increasing the adjustable value when no body diode conduction is detected at the dc-dc converter output stage switch.

8. The method of claim 7, further comprising switching on the dc-dc converter output stage switch earlier at a next switching cycle when body diode conduction is detected at the dc-dc converter output stage switch.

9. The method of claim 7, further comprising:
    adjusting a second adjustable value according to body diode conduction at the dc-dc converter output stage switch;
    determining a second time delay based on the second adjustable value; and
    switching off the dc-dc converter output stage switch at the conclusion of the programmable time delay.

10. The method of claim 9, further comprising:
    increasing the second adjustable value when body diode conduction is detected at the dc-dc converter output stage switch; and
    decreasing the second adjustable value when no body diode conduction is detected at the dc-dc converter output stage switch.

11. The method of claim 7, further comprising commencing the time delay when a current based on an output stage of the dc-dc converter meets a preset current threshold.

12. The method of claim 7, wherein the adjustable value toggles between two values in a steady state, wherein at one switching cycle body diode conduction is detected and at a next switching cycle no body diode conduction is detected.

13. An apparatus comprising:
    a first power switch arranged to control input power, the first power switch arranged to switch off when a current based on the first power switch meets a current threshold;
    a second power switch arranged to control output power, the second power switch arranged to switch on at the conclusion of a time delay, the time delay being based on an adjustable value;
    a detector block arranged to detect body diode conduction at the second power switch; and
    a control block arranged to control timing of the second power switch using the time delay and based on the detected body diode conduction, wherein the control block is configured to decrease the adjustable value when body diode conduction is detected and to increase the adjustable value when no body diode conduction is detected.

14. The apparatus of claim 13, further comprising a programmable delay line arranged to delay operation of the second power switch upon receipt of a trigger.

15. The apparatus of claim 13, wherein the second power switch is arranged to switch off at the conclusion of a second time delay.

16. The apparatus of claim 15, wherein the second time delay is based on a second adjustable value.

17. The apparatus of claim 16, wherein the control block is arranged to adjust the second adjustable value based on the detected body diode conduction.

18. The apparatus of claim 13, wherein at least one of the first power switch and the second power switch are comprised of multiple switches.

19. An apparatus for controlling a dc-dc converter, comprising:

a detector block arranged to detect body diode conduction at an output power switch of the dc-dc converter; and
a control block arranged to control timing of the output power switch of the dc-dc converter based on the detected body diode conduction,
wherein the control block is arranged to control timing of the output power switch of the dc-dc converter relative to an input power switch of the dc-dc converter, such that the body diode conduction at the output power switch of the dc-dc converter is minimized.

20. The apparatus of claim 19, wherein the control block is arranged to delay operation of the output power switch of the dc-dc converter upon receipt of a trigger.

21. The apparatus of claim 20, wherein the trigger is based on a current at an input stage of the dc-dc converter crossing a threshold value.

22. The apparatus of claim 19, further comprising a digital state machine arranged to generate control signals configured to control timing of the output power switch of the dc-dc converter.

* * * * *